US012729557B2

(12) United States Patent
Chaput et al.

(10) Patent No.: US 12,729,557 B2
(45) Date of Patent: Sep. 8, 2026

(54) UTILITY GRID AND TOWER UPGRADE SYSTEM AND METHOD

(71) Applicant: SIMPLE GRID SOLUTIONS LTD, Winnipeg (CA)

(72) Inventors: Luke J. Chaput, Winnipeg (CA); Nathan I. Stahl, Winnipeg (CA)

(73) Assignee: SIMPLE GRID SOLUTIONS LTD, Winnipeg (CA)

( * ) Notice: Subject to any disclaimer, the term of this patent is extended or adjusted under 35 U.S.C. 154(b) by 156 days.

(21) Appl. No.: 18/749,068

(22) Filed: Jun. 20, 2024

(65) Prior Publication Data

US 2024/0426126 A1 Dec. 26, 2024

Related U.S. Application Data

(60) Provisional application No. 63/522,257, filed on Jun. 21, 2023.

(51) Int. Cl.
*H02G 7/00* (2006.01)
*E02D 27/42* (2006.01)
*E04H 12/10* (2006.01)

(52) U.S. Cl.
CPC ............ *E04H 12/10* (2013.01); *E02D 27/42* (2013.01); *H02G 7/00* (2013.01)

(58) Field of Classification Search
None
See application file for complete search history.

(56) References Cited

U.S. PATENT DOCUMENTS 1,687,449 A * 10/1928 Hill ......................... E04H 12/10 174/45 R
1,687,979 A * 10/1928 Goodrich ................ E04H 12/10 52/297
3,685,144 A * 8/1972 Trimble ................ G11B 5/313 360/123.01

(Continued)

OTHER PUBLICATIONS

Callery et al., "Transmission Upgrade Leverages Existing Line," T&D World, Nov. 9, 2017, pp. 1/8 to 8/8 [online] Retrieved Aug. 26, 2024 from the Internet: <https://www.tdworld.com/grid-innovations/transmission/article/20970454/transmission-uggrade-leverages-existing-line>.

(Continued)

*Primary Examiner* — Krystal Robinson
(74) *Attorney, Agent, or Firm* — Barnes & Thornburg LLP; Mark J. Nahnsen

(57) ABSTRACT

An electrical utility upgrade system for an existing transmission tower having a foundation, a tower structure and an electrical circuit. The upgrade system includes an exoskeleton structure coupled to the bridge bypass frame and secured to the foundation. The system also includes a bridge bypass frame positioned above the existing electrical circuit and coupled to the exoskeleton structure. The system further includes a tower top circuit positioned above the existing electrical circuit and coupled to the bridge bypass frame and transmission line hardware coupled to the tower top circuit. The system is design to transfer forces exerted on the tower top circuit through the bridge bypass frame to the exoskeleton structure and to the foundation to reduce forces acting on the tower structure.

18 Claims, 17 Drawing Sheets

(56) References Cited

U.S. PATENT DOCUMENTS

| | | | | |
|---|---|---|---|---|
| 8,319,573 | B2 * | 11/2012 | Kanschat | H03H 7/004 333/24 R |
| 12,079,015 | B1 * | 9/2024 | Bradley | G05D 1/661 |
| 2003/0042571 | A1 * | 3/2003 | Chen | H10W 20/495 336/200 |
| 2011/0126488 | A1 | 6/2011 | Hedinger et al. | |
| 2017/0207022 | A1 * | 7/2017 | Song | H01F 29/025 |
| 2019/0115740 | A1 * | 4/2019 | Bartminn | H02G 7/20 |

OTHER PUBLICATIONS

Search Report & Written Opinion issued in PCT/CA2024/050842 (Aug. 30, 2024).

International Preliminary Report on Patentability issued in PCT/CA2024/050842 (Dec. 23, 2025).

* cited by examiner

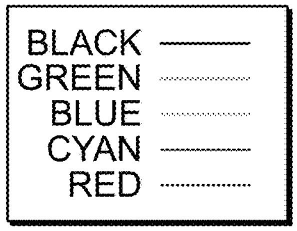
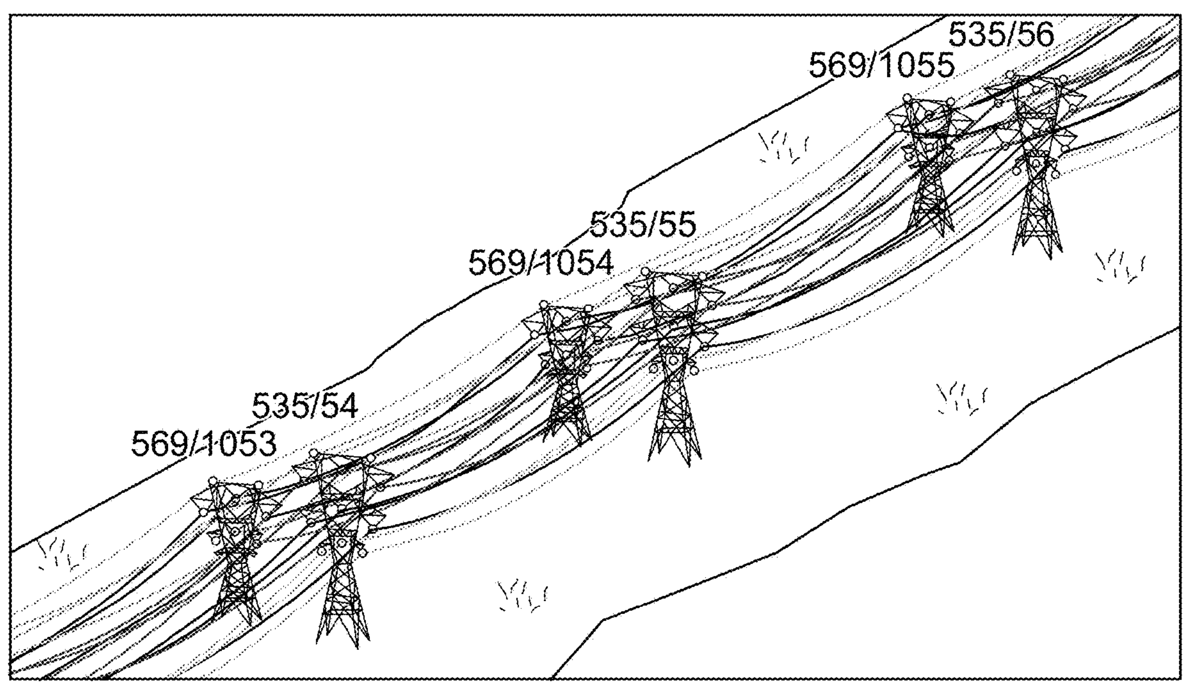
FIG. 5

SECTION PROPERTIES:

GEOMETRIC PROPERTIES

| Property | Value |
|---|---|
| Area ⓘ | 2354.83 $mm^2$ |
| $Centroid_z$ ⓘ | 34.798 mm |
| $Centroid_y$ ⓘ | 34.798 mm |

MOMENT OF INERTIA

| Property | Value |
|---|---|
| $I_z$ ⓘ | 3.64619 $x10^6$ $mm^4$ |
| $I_y$ ⓘ | 3.64619 $x10^6$ $mm^4$ |
| $I_{zy}$ ⓘ | -2.14891 $x10^6$ $mm^4$ |
| $I_{zp}$ ⓘ | 5.82724 $x10^6$ $mm^4$ |
| $I_{yp}$ ⓘ | 1.47762 $x10^6$ $mm^4$ |
| α ⓘ | -45 ° |
| $r_z$ ⓘ | 39.3234 mm |
| $r_y$ ⓘ | 39.3234 mm |
| $r_{zp}$ ⓘ | 49.5419 mm |
| $r_{yp}$ ⓘ | 25.264 mm |

GEOMETRIC PROPERTIES

| Property | Value |
|---|---|
| Area ⓘ | 4232.2 $mm^2$ |
| $Centroid_z$ ⓘ | 1.33023 mm |
| $Centroid_y$ ⓘ | 1.62295 mm |

MOMENT OF INERTIA

| Property | Value |
|---|---|
| $I_z$ ⓘ | 1.16902 $x10^7$ $mm^4$ |
| $I_y$ ⓘ | 1.17952 $x10^7$ $mm^4$ |
| $I_{zy}$ ⓘ | 3.85193 $x10^6$ $mm^4$ |
| $I_{zp}$ ⓘ | 7.89041 $x10^6$ $mm^4$ |
| $I_{yp}$ ⓘ | 1.5595 $x10^7$ $mm^4$ |
| α ⓘ | -44.6093 ° |
| $r_z$ ⓘ | 52.5566 mm |
| $r_y$ ⓘ | 52.7923 mm |
| $r_{zp}$ ⓘ | 43.1784 mm |
| $r_{yp}$ ⓘ | 60.7029 mm |

| | | | |
|---|---|---|---|
| AREA UPGRADE: | 180% | | |
| Centroid Shift - mm: | 33.5 | | |
| rz/ry (rx/ry) - mm: | 39.3234 | rz/ry (rx/ry) - mm: | 52.6 |
| ryp (rz) - mm: | 25.264 | ryp (rz) - mm: | 43.18 |
| R(x/y) Upgrade: | 134% | | |
| R(z) Upgrade: | 171% | | |

*FIG. 11*

SECTION PROPERTIES:

GEOMETRIC PROPERTIES

| Property | | Value |
|---|---|---|
| Area | ⓘ | 2354.83 $mm^2$ |
| $Centroid_z$ | ⓘ | 34.798 mm |
| $Centroid_y$ | ⓘ | 34.798 mm |

MOMENT OF INERTIA

| Property | | Value |
|---|---|---|
| $I_z$ | ⓘ | 3.64619 $x10^6$ $mm^4$ |
| $I_y$ | ⓘ | 3.64619 $x10^6$ $mm^4$ |
| $I_{zy}$ | ⓘ | -2.14891 $x10^6$ $mm^4$ |
| $I_{zp}$ | ⓘ | 5.82724 $x10^6$ $mm^4$ |
| $I_{yp}$ | ⓘ | 1.47762 $x10^6$ $mm^4$ |
| α | ⓘ | -45 ° |
| $r_z$ | ⓘ | 39.3234 mm |
| $r_y$ | ⓘ | 39.3234 mm |
| $r_{zp}$ | ⓘ | 49.5419 mm |
| $r_{yp}$ | ⓘ | 25.264 mm |

GEOMETRIC PROPERTIES

| Property | | Value |
|---|---|---|
| Area | ⓘ | 3637.36 $mm^2$ |
| $Centroid_z$ | ⓘ | 13.1234 mm |
| $Centroid_y$ | ⓘ | 13.1234 mm |

MOMENT OF INERTIA

| Property | | Value |
|---|---|---|
| $I_z$ | ⓘ | 8.14682 $x10^6$ $mm^4$ |
| $I_y$ | ⓘ | 8.14682 $x10^6$ $mm^4$ |
| $I_{zy}$ | ⓘ | 3.18108 $x10^5$ $mm^4$ |
| $I_{zp}$ | ⓘ | 8.46492 $x10^6$ $mm^4$ |
| $I_{yp}$ | ⓘ | 7.82871 $x10^6$ $mm^4$ |
| α | ⓘ | 45 ° |
| $r_z$ | ⓘ | 47.3235 mm |
| $r_y$ | ⓘ | 47.3235 mm |
| $r_{zp}$ | ⓘ | 48.2386 mm |
| $r_{yp}$ | ⓘ | 46.3904 mm |

| | | | |
|---|---|---|---|
| AREA UPGRADE: | 154% | | |
| Centroid Shift - mm: | 21.7 | | |
| rz/ry (rx/ry) - mm: | 39.3234 | rz/ry (rx/ry) - mm: | 47.3235 |
| ryp (rz) - mm: | 25.264 | ryp (rz) - mm: | 46.3904 |
| R(x/y) Upgrade: | 120% | | |
| R(z) Upgrade: | 184% | | |

*FIG. 15*

Black
Green
Cyan
Red
18
19
20
21
24
26

UTILITY GRID AND TOWER UPGRADE SYSTEM AND METHOD

CROSS REFERENCE TO RELATED APPLICATION

This application claims priority under 35 U.S.C. § 119 (e) to U.S. Provisional Application Ser. No. 63/522,257, filed Jun. 21, 2023, which is expressly incorporated herein by reference in its entirety.

FIELD OF THE DISCLOSURE

The present disclosure relates generally to the electric utility industry, and more specifically to upgrading the electric utility grid.

BACKGROUND

The electric utility grid may be the weakest link in the chain connecting the U.S., Canada and other countries to a clean energy future. Seventy percent of the utility grid transmission lines and power transformers in numerous countries are well over 50 years old. There is also insufficient transmission capacity, especially transmission that facilitates transfer of power across regions. Strengthening the grid to support the decarbonization of a country's electricity system will take hundreds of billions of dollars of new investment.

Financial investment alone will not be enough. It will also require a rapid evolution of the regulatory structures that determine how high-voltage transmission lines are to be built using existing technology. Complicated regulatory issues include how to site the lines using existing technology without running roughshod over landowner rights or harming the environment, how to speed up the construction process, and how to determine who should cover the costs. Traditional energy producers are now under strain from a combination of constantly rising electricity demand, aging production and transmission infrastructure. In view of the regulatory, right of way, and cost constraints, a better system and method is needed to rapidly improve the utility grid.

SUMMARY

The present disclosure may comprise one or more of the following features and combinations thereof.

In illustrative embodiments, the present disclosure is directed to an electrical transmission tower upgrade and method for an existing transmission line structure(s) and/or route. The utility transmission tower upgrade allows for the re-classification of the existing high voltage transmission line structure and/or conversion of existing high voltage transmission lines (corridor/path) to multiple circuit configurations such as double-circuit, triple-circuit, or greater configurations, the upgrade is referred to as EXOGRID™. The proposed technology also allows for an upgrade of existing structure design limitations by providing a significant increase in strength, capacity, and reliability to the existing structure by installing an exoskeleton superstructure, which can accommodate new design codes, criteria, and/or safety requirements. The proposed technology can further allow for a re-classification of an existing structure to be safely and economically converted into a higher capacity structure capable of withstanding line angle, full tension dead-end loading and/or additional overhead circuits with the use of the aforementioned exoskeleton superstructure.

In illustrative embodiments, the present disclosure is applicable to various phase configurations, such as horizontal or delta converted to double-circuit horizontal or double circuit delta, or a combination of horizontal, vertical and delta configurations, as shown in FIGS. 1-3. The new circuit voltage can be configured to match existing voltage or be of a higher voltage. Existing circuits could be upgraded to higher voltages. As an example, existing 230 kV circuit with new overhead circuit can be configured to work at the same operating voltage of the existing circuit of the utility or can be configured to work at higher voltages. As an example, an existing circuit could be 230 kV. The new overhead circuits can be configured to operate at 230 kV to match the existing circuit or could be configured to operate at a higher voltage, such as 345 kV or 500 kV. Bussing of circuits also provides additional options for final circuit configuration.

In illustrative embodiments, the transmission tower upgrade and method uses existing transmission lines and structural support and the tower foundation footprint. The transmission tower upgrade system includes an external structural skeleton that is coupled to the existing tower structure to support the loading of the additional overhead circuit, and/or increasing its existing structural capacity in order to re-classifying the existing structure to withstand increased loading or to a new structure configuration to withstand line angle or full tension dead-end loading. The transmission tower upgrade and method allows for installation of all or part of the upgrade without de-energizing the existing circuit or allowing for limited de-energizing of the existing circuit during the upgrade installation.

In illustrative embodiments, the method includes feasibility study, condition assessment, detailed design and analysis, and installation. The method includes evaluating the existing structure configurations to determine applicability for conversion to a new structure configuration or adding additional overhead circuit or circuits. It also includes field evaluation on the condition of existing structures as well as ground line and transitional zones of existing foundations. It further includes the detailed design and analysis phase builds.

These and other features of the present disclosure will become more apparent from the following description of the illustrative embodiments.

BRIEF DESCRIPTION OF THE DRAWINGS

FIG. 5 is a perspective view of a transmission line right-of way (Corridor/Path) which has been upgraded to a multi-circuit right-of way;

FIG. 11 is a chart of the geometric properties of the tower section, moments of inertia and radius of gyration as well as percent of section properties upgrade;

FIG. 15 is a chart of the geometric properties of the tower section, moments of inertia and radius of gyration as well as percent of section properties upgrade;

DETAILED DESCRIPTION OF THE DRAWINGS

Figures 1, 2:
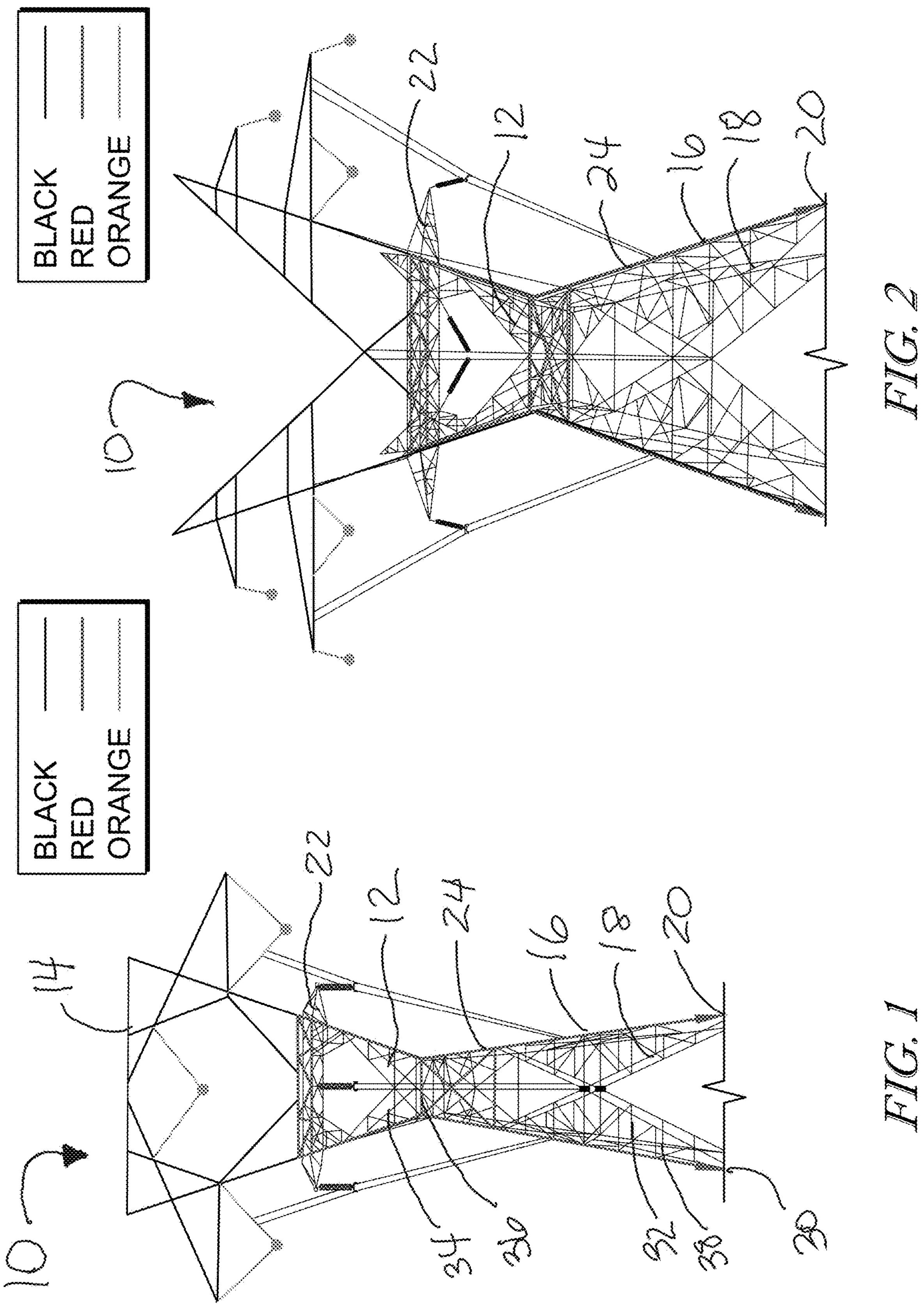
FIG. 1 is a perspective view of a lattice type single horizontal circuit transmission tower including a new high voltage single circuit delta configuration tower top above the existing circuit and showing the receiving bracket and bridge bypass frame for the new tower top and the exoskeleton that transmits forces from the tower top to the foundation.
FIG. 2 is a perspective view of a lattice type single horizontal circuit transmission tower including a new high voltage double circuit delta configuration tower top above the existing circuit and showing the bypass bracket and bridge bypass frame for the new tower top and the exoskeleton that transmits forces from the tower top to the foundation.

For the purposes of promoting an understanding of the principles of the disclosure, reference will now be made to a number of illustrative embodiments illustrated in the drawings and specific language will be used to describe the same.

Figure 3:
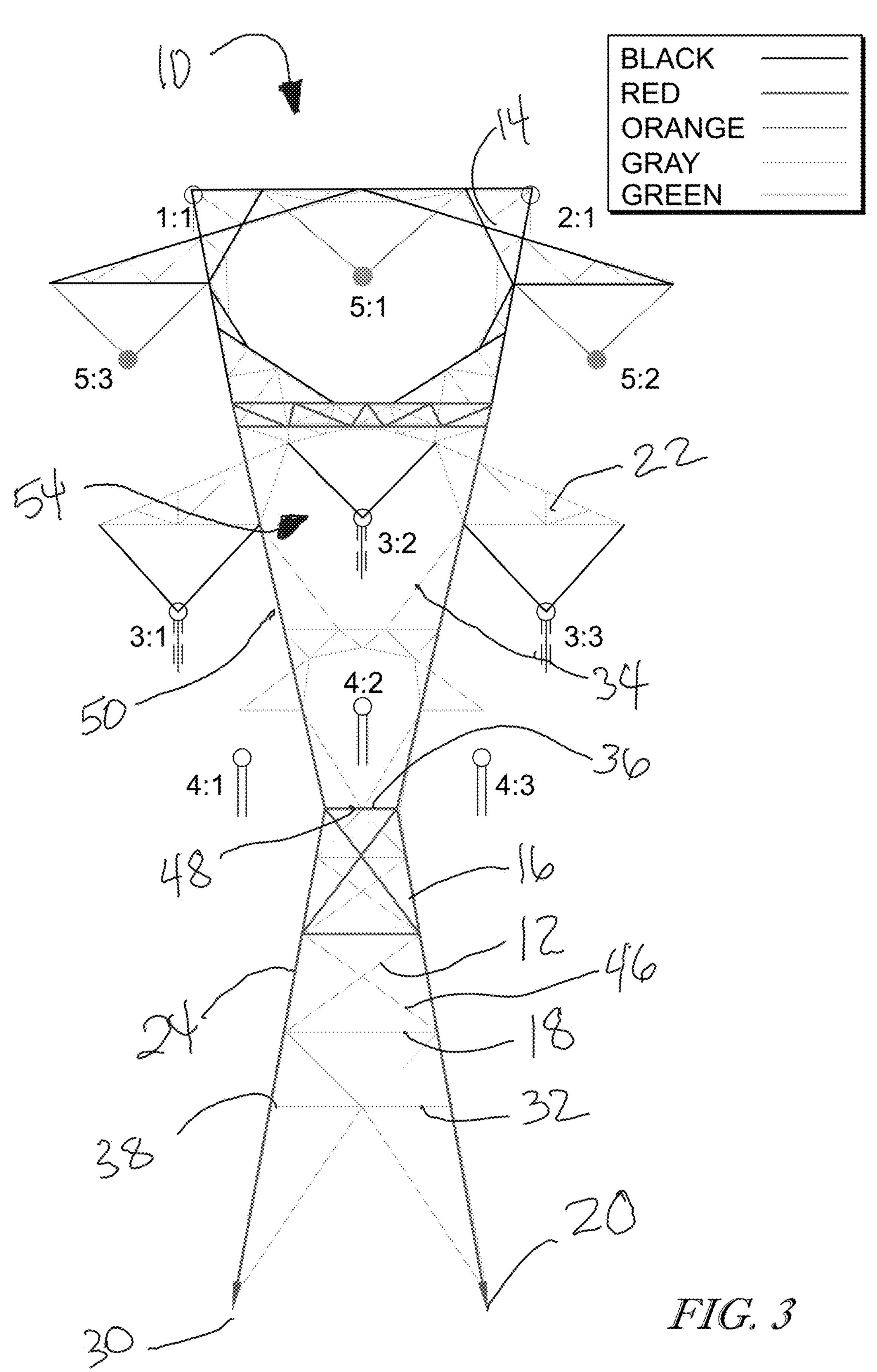
FIG. 3 is a perspective view of a lattice type double delta circuit transmission tower including a new high voltage triple circuit delta configuration tower top above the existing circuits and showing the bypass bracket and bridge bypass frame for the new tower top and the exoskeleton that transmits forces from the tower top to the foundations.
Figure 4:
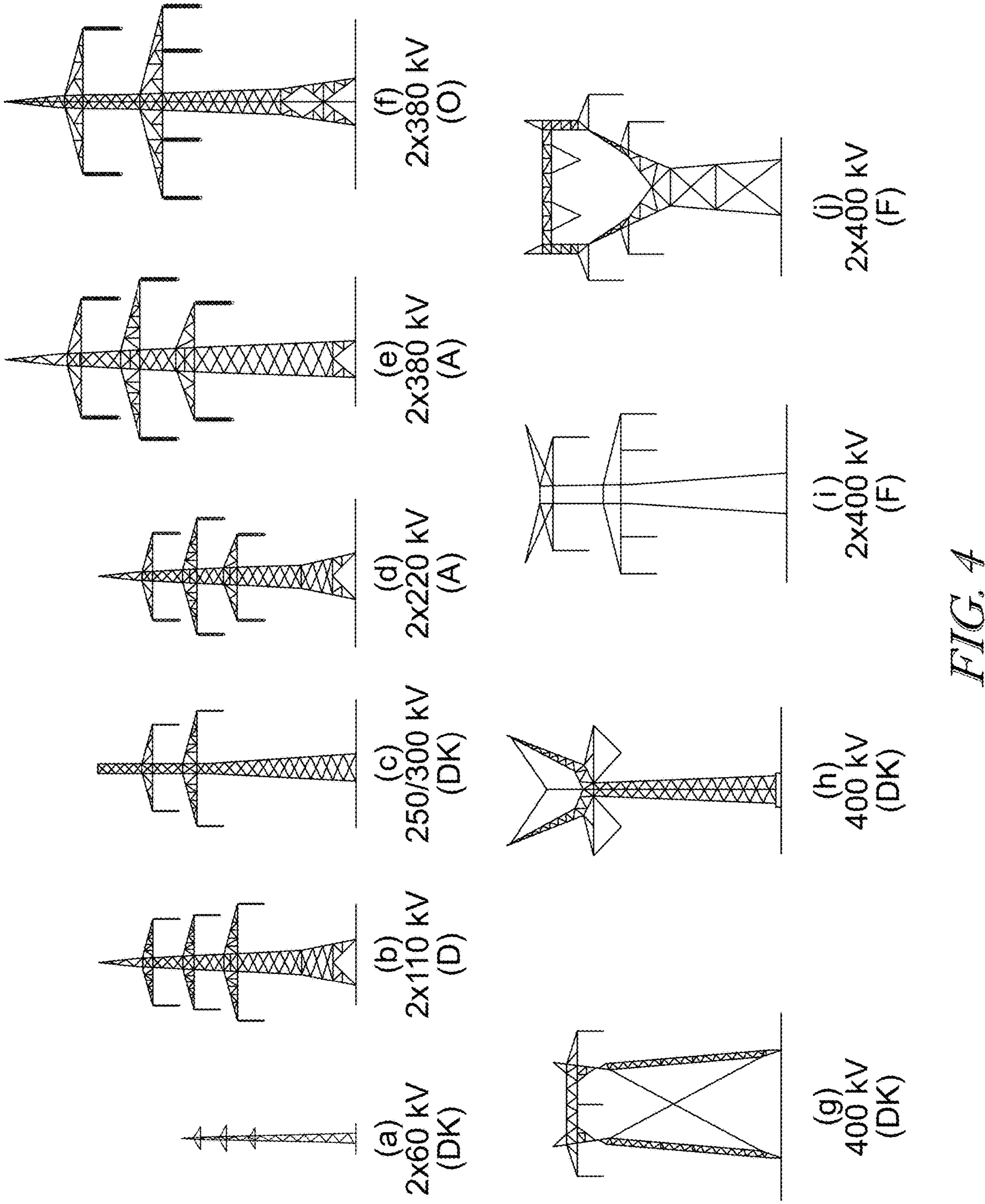
FIG. 4 are illustrates of various types of transmission towers.
Figure 6:
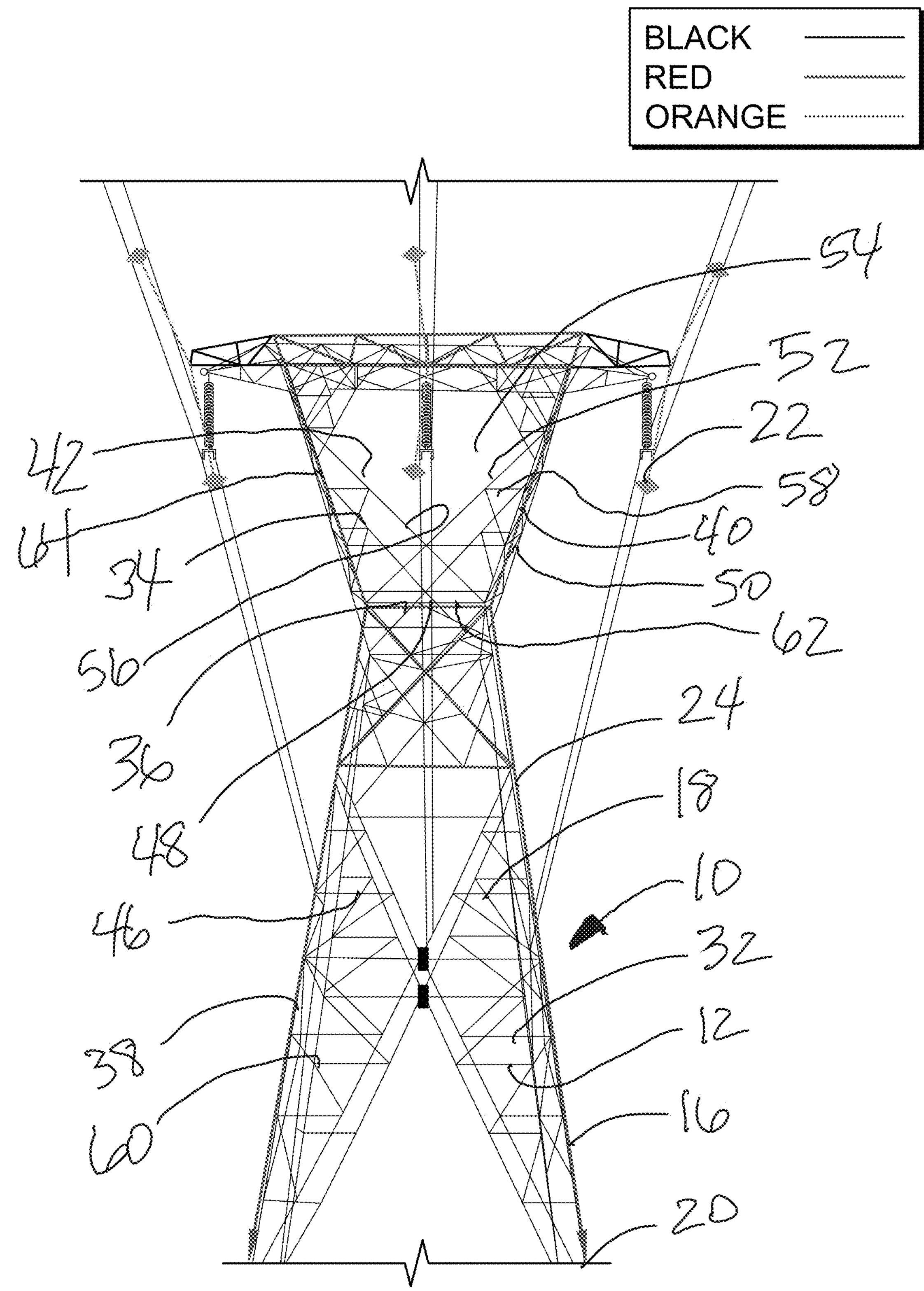
FIG. 6 is a perspective view of a lattice type single horizontal circuit transmission tower including a re-classification from suspension circuit configuration to dead-end configuration and showing the bypass bracket for the new cross-arm and the exoskeleton that transmits forces from the tower top to the foundations.

An electrical transmission tower upgrade and method is shown in FIGS. 1-3. Transmission tower upgrade system 10 is configured for use in connection with electrical transmission towers 12 used in the electrical power industry, as shown in FIG. 4, to add additional circuits to an existing tower structure or to strengthen towers 12 so that they can be reclassified for line angle or full tension dead-end loading usage. The present invention allows the utility upgrades without destruction of existing infrastructure or securing new right of ways and permitting.

In illustrative embodiments, a utility can add an additional top section circuit 14 to almost any voltage to the tower 12. FIG. 1 illustrates a 500 kV additional circuit over an existing 230 kV circuit, for example but almost any voltage configuration can be accomplished using the system and method. The systems utility is multi-fold, as it can provide redundancy to an existing line, corridor or substation, or it can be used for complete system upgrades by doubling, tripling, or more the capacity of the existing line. As part of the method, the structures and foundations of the existing utility towers 12 undergo analysis and structural upgrades and then a new top section circuit 14 is installed with an upper tower section modification and then new conductor(s) would be strung in. The costs of the system and method would be less than building a completely new line but eliminates or significantly reduces the time and expense of trying to obtain new right of ways and permits for new lines. The proposed system and method is a sustainable solution to obtaining more capacity out of an existing grid.

The proposed system and method are used in connection with existing transmission line routes. The circuit multiplier EXOGRID™ system adds additional overhead top section circuit(s) 14 to an existing transmission structure 12 to increase overall line capacity without the need for using new right of ways and completely new towers. The system and method converts existing high-voltage single circuit transmission line (corridor/path) to double-circuit, triple-circuit, or greater circuit configurations. The system and method could also convert existing double circuit lines to triple or quadruple circuits if desired. The proposed system and method is applicable to various phase configurations including horizontal or delta converted to double-circuit horizontal or double-circuit delta, or a combination of horizontal, vertical and delta configurations, as shown in FIGS. 1-3, for example.

The new circuit voltage can match existing circuit voltage or be of a higher voltage. The existing circuit can also be upgraded to higher voltage. As an example, an existing 230 kV circuit with the new overhead top section circuit 14 added in accordance with this disclosure can have a matching voltage of 230 kV or, alternative, could have a higher voltage of 345 kV or 500 kV, as shown in FIGS. 1-3. Bussing of circuits also provides additional options for final circuit configuration.

The system and method uses existing transmission line and structural support as well as the existing foundation footprint. The system adds a structural exoskeleton 16 that is added to the tower 12 to support the loading of the additional overhead top section circuit structure 14. The system uses the existing transmission tower structure 18 and foundation footprint 20 to install a new structural exoskeleton 16 around the existing tower structure 18 and attaching the exoskeleton 16 to the existing and or an upgraded foundation 20 allows utilities to significantly improve the capacity on the transmission lines without acquiring new right-of-ways. The new structural exoskeleton 16 is used to support the additional top section circuits 14 attached above the existing circuits 22 EXOGRID. In FIGS. 1-3, the darker shaded lines represent the structural exoskeleton 16 that transmits structural loads from the new top section circuit 14 to the foundation 20.

While a waist type tower is shown in FIGS. 1 & 2, the present invention can be used with other lattice type towers use to carry high voltage lines, including double circuit towers, guyed V towers, and other lattice structured towers of the types shown in FIG. 4. Typical waist-type towers 12 include a plurality of foundation footings 30 that are typically cement footings. The towers 12 include a lower tower portion 32 and an upper tower portion 34, separated by a waist region 36. The tower includes a series of legs 38 that are formed of diagonal oriented members 40 that extend from the foundation 30 to the waist region 36 of the tower 12. The legs 38 also include a series of inboard diagonal members 42 that extend from the foundation 30 proximate the mid portion of the lower tower portion 32 at a horizontal member 44. The tower components are typically made from angle iron, flat stock, and tubular stock that are secured together to form the tower structure. Legs 38 also include a series of lattice members 46 to strengthen the legs 38. Lower tower portion 32 tapers inward as it reaches the waist region 36. Waist region 36 includes a horizontal waist member 48 and upper tower portion 34 extends upward and outward from the waist region 36. Upper tower portion 34 includes external diagonal members 50 that extend from the waist region 36 to a cross arm 52 that includes the upper circuit. A tower window 54 is formed by inner diagonal members 56. Upper tower portion 34 includes a plurality of lattice members 58 to provide strength to the upper tower portion 34.

Figure 10:
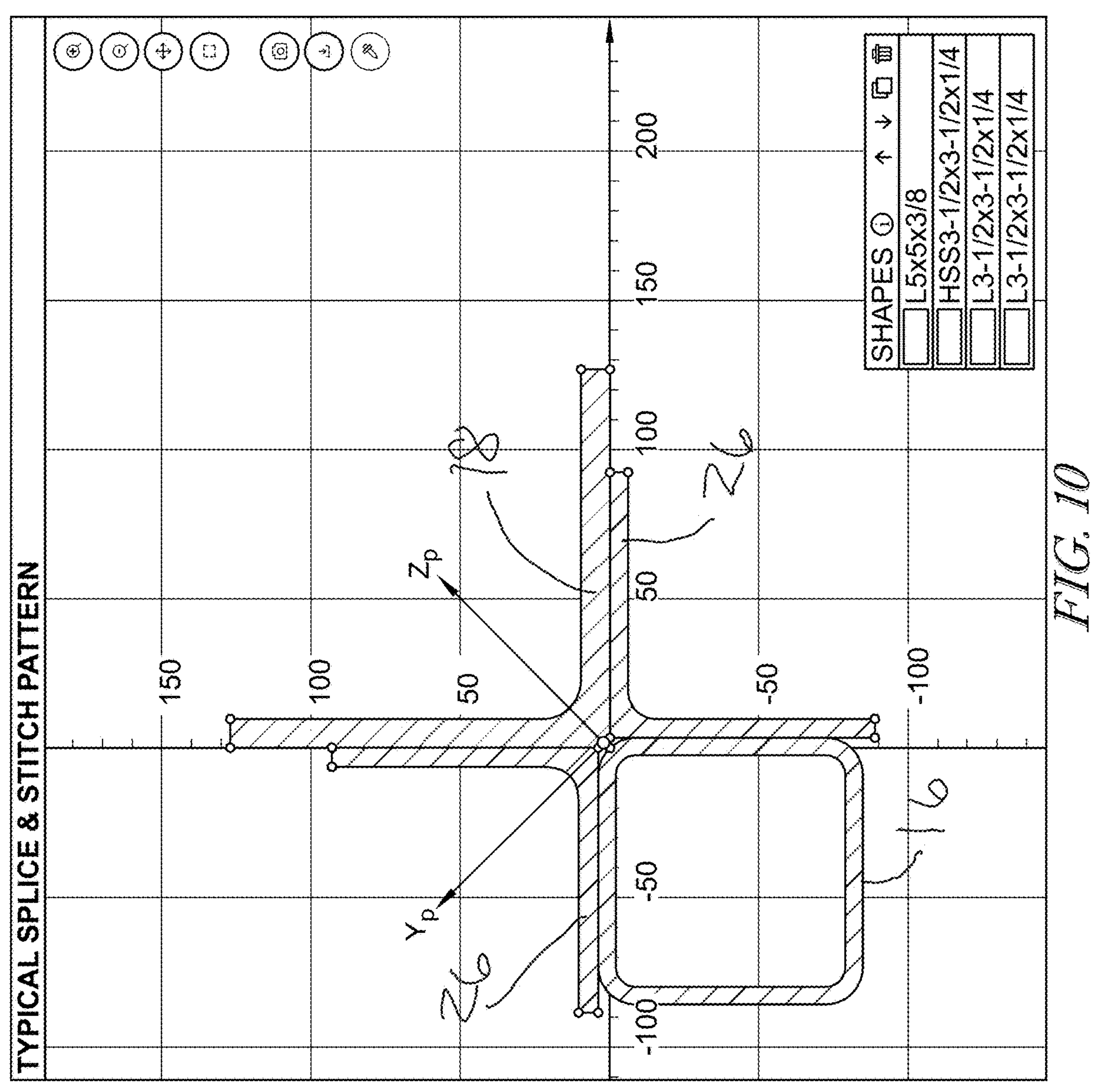
FIG. 10 is a sectional view of an exoskeleton section secured to an existing tower leg showing a splice and stitch pattern of the square tubing coupled to the existing tower leg section with two additional 90 degree bracing sections.

The exoskeleton 16 is secured to the foundation 20 and includes exoskeleton leg sections 60 that extend from the foundation 20 upward along legs 38 to the waist region 36. Exoskeleton leg sections 60 are secured to legs 38 by fasteners or welding and can include splice and stitch members that are used to secure exoskeleton leg sections 60 to the legs 38, as shown in FIG. 10, for example. Exoskeleton 16 includes an exoskeleton waist region 62 proximate the waist region 36 of the tower that the leg sections 60 connect. Exoskeleton also includes an exoskeleton upper section 64 that extends above and is connected to the cross brace region 62. Exoskeleton upper section 64 is shown as trapezoidal in shape but other shapes can be used. The exoskeleton 16 includes the bridge bypass member 17 that is preferably positioned above the existing circuits 22 and secured to the exoskeleton upper section 64. Bridge bypass member 17 is preferably a truss or lattice shaped structure that forms the upper portion of the exoskeleton upper region 64, above the existing circuits 22. An overhead top section circuit structure 14 is then secured to the bridge bypass member 17. Weight, wind loads, and wire tension are transmitted from the top section circuit structure 14, to the bridge bypass member 17, to the exoskeleton upper section 64, to the exoskeleton waist region 62, to the exoskeleton leg sections 60 and to the foundation 20. The transfer forces acting on the top section circuit structure 14 through the exoskeleton 16 to the foundation instead of through the existing tower structure 12. The exoskeleton 16 also provide additional support for the existing circuits 22 in addition to the new circuits being added to the tower 12.

As part of installing the exoskeleton 16, the existing tower structure 18 is used as rigging and mounting supports for construction to install the external structural exoskeleton 16 supports to the existing tower 12. The additional structural exoskeleton supports transfer the additional loads created by the additional top section circuit structure 14 into the existing foundation 20 or the upgraded foundation, if required. The exoskeleton 16 includes framing members 24 that are secured to the existing tower framing members by the use of fasteners or welding. If an upgraded foundation is added, it may include a variety of foundation upgrade capacity methods such as increased foundation diameters, concrete encasements, upgraded or new tower leg abutment attachment points, installation of helical pile systems, installation of new driven or poured in place piles, all of which would be integrated into/with the existing tower foundation 20 for the exoskeleton 16 to be secured.

Figure 7:
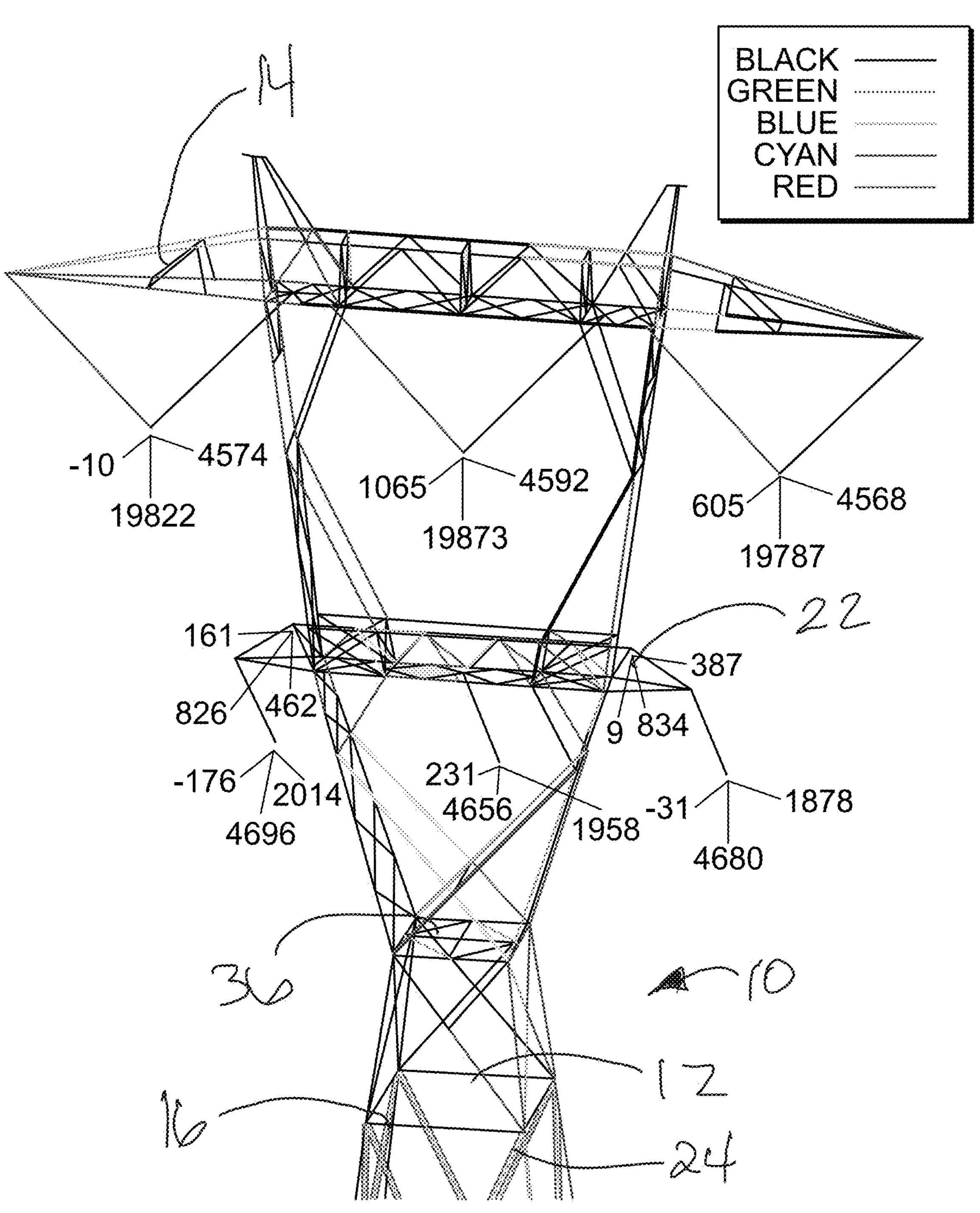
FIG. 7 is a perspective view of a new 500 kV circuit section secured to an existing lattice tower on top of the existing 220 kV circuit and showing the member utilization color bar of each member.

Depending on the condition of the original footings, the existing tower foundations 20 may need to be upgraded to provide support for the additional top section circuit structure 14. Foundation upgrades can be integrated into the existing disturbed area of the original foundation footprint, thus removing the requirements for new right of way casements and allowances. Using the existing tower structure 18 as a rigging and mounting support system, this allows the utilities to install most of the structural exoskeleton framing members 24 of the present disclosure (>50%) without requiring a power outage, thus saving significant outage costs during tower upgrade construction. The present system also reduces the required amount of large cranes at the site thus reducing the environmental impact during construction. Loads on the tower structure 12 and foundation 20 are calculated as illustrated in FIG. 7. Units illustrated are in pound-force (lbs) and represent sample load vectors for Vertical/Transverse/Longitudinal loads (V/T/L) from the conductors, which are applied to the Exogrid structures.

Figures 8, 9:
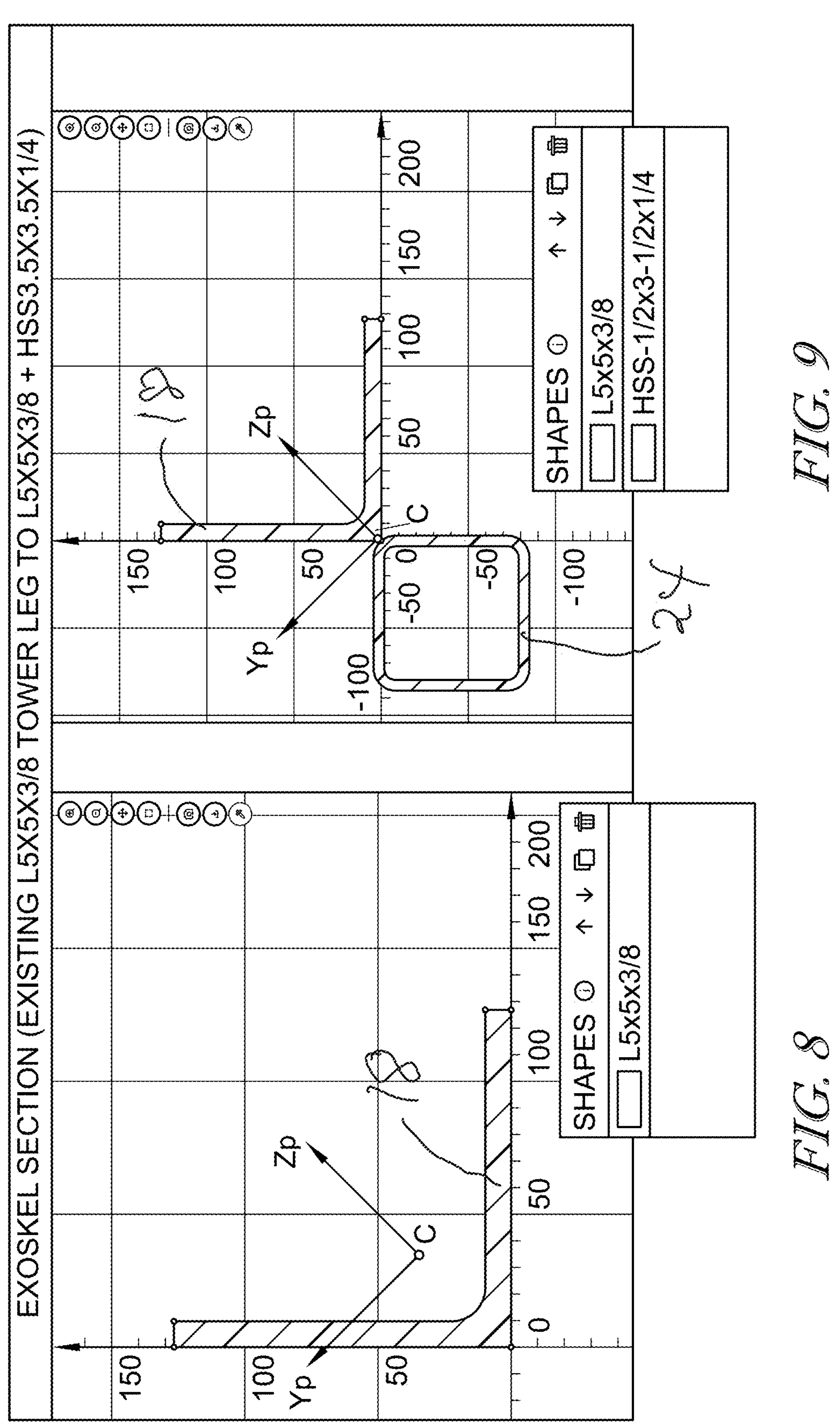
FIG. 8 is a sectional view of an existing tower leg section.
FIG. 9 is a sectional view of an a square tubing exoskeleton section secured to an existing tower leg.
Figure 13:
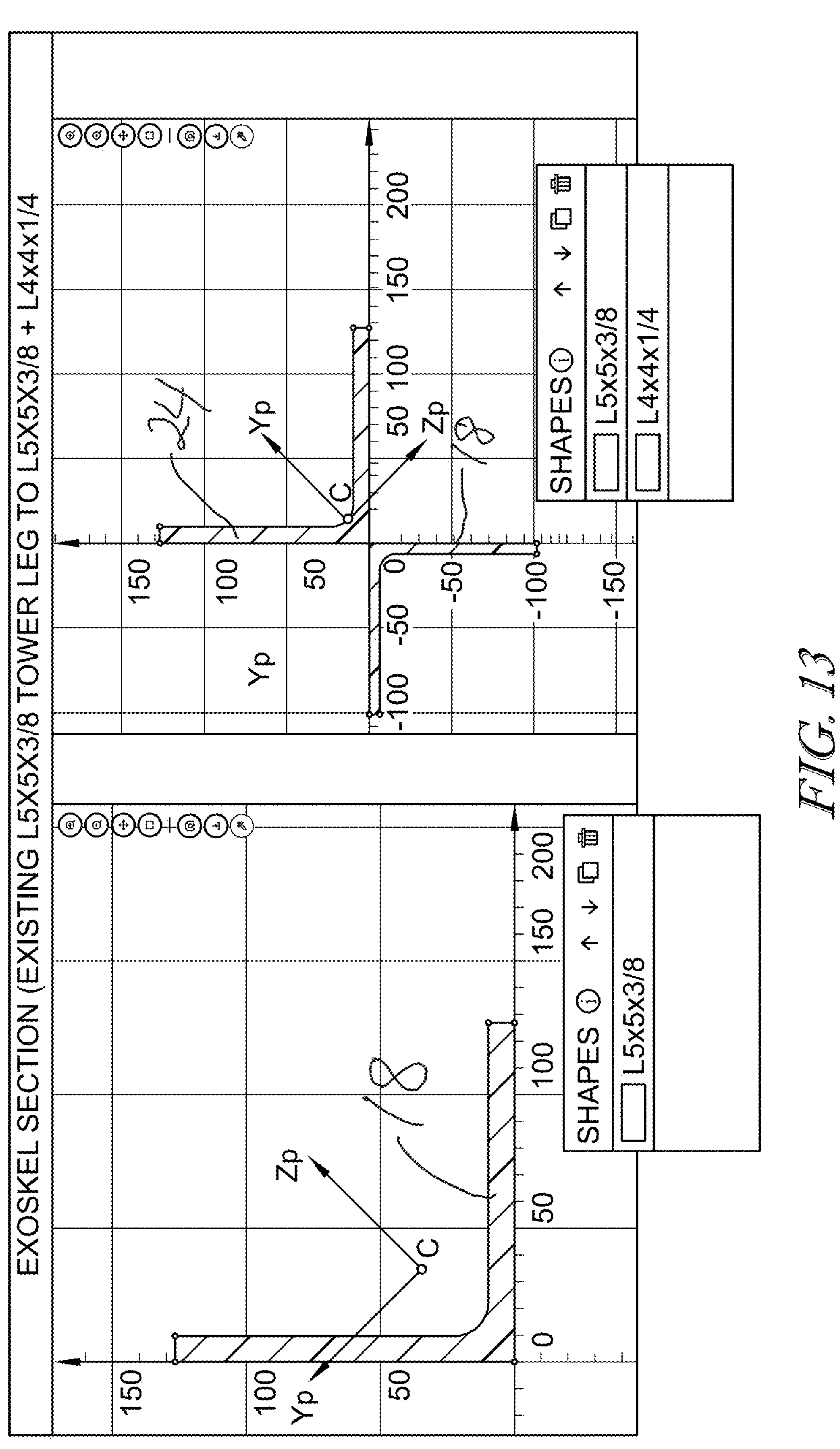
FIG. 13 is a sectional view of an alternate exoskeleton secured to an existing tower leg.
Figure 14:
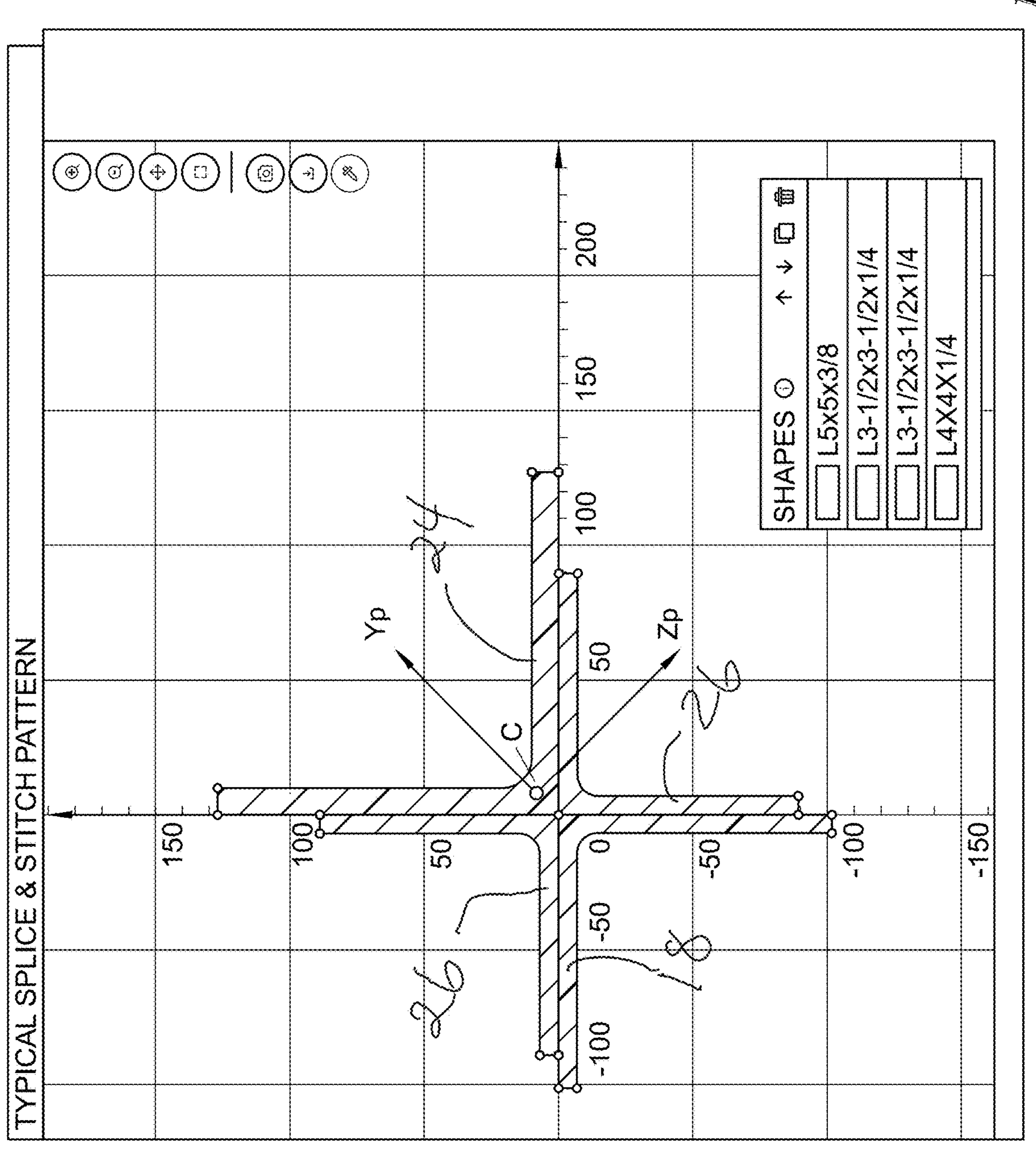
FIG. 14 is a sectional view showing the exoskeleton secured to an existing tower leg by splice and stitch pattern.

Tower top section circuit upgrades are developed project to project and depend on the types of existing towers 12 used and the foundations 20 supporting the towers. Cross-section examples of exoskeleton sections HSS & angle with sample capacity upgrades are provided in FIGS. 10, and 14. Original tower sections are illustrated in FIGS. 8, and 13. The exoskeleton 16 includes the installation of various HSS & angle iron members 16 and splice and stitch members 26 or other structural steel to the existing structure, as shown in FIGS. 10 and 14. The system increases the capacity of existing tower legs by reinforcing them through the attachment of additional HSS & angle members parallel to the existing legs from the base upward. The exoskeleton reinforcing members are connected corner-to-corner to the existing legs by bolted connections. The exoskeleton 16 carries forces from the new top section circuit structure 14 to the foundation 20 to reduce the load on the existing structure 12.

Figures 17, 18, 19, 20, 21:
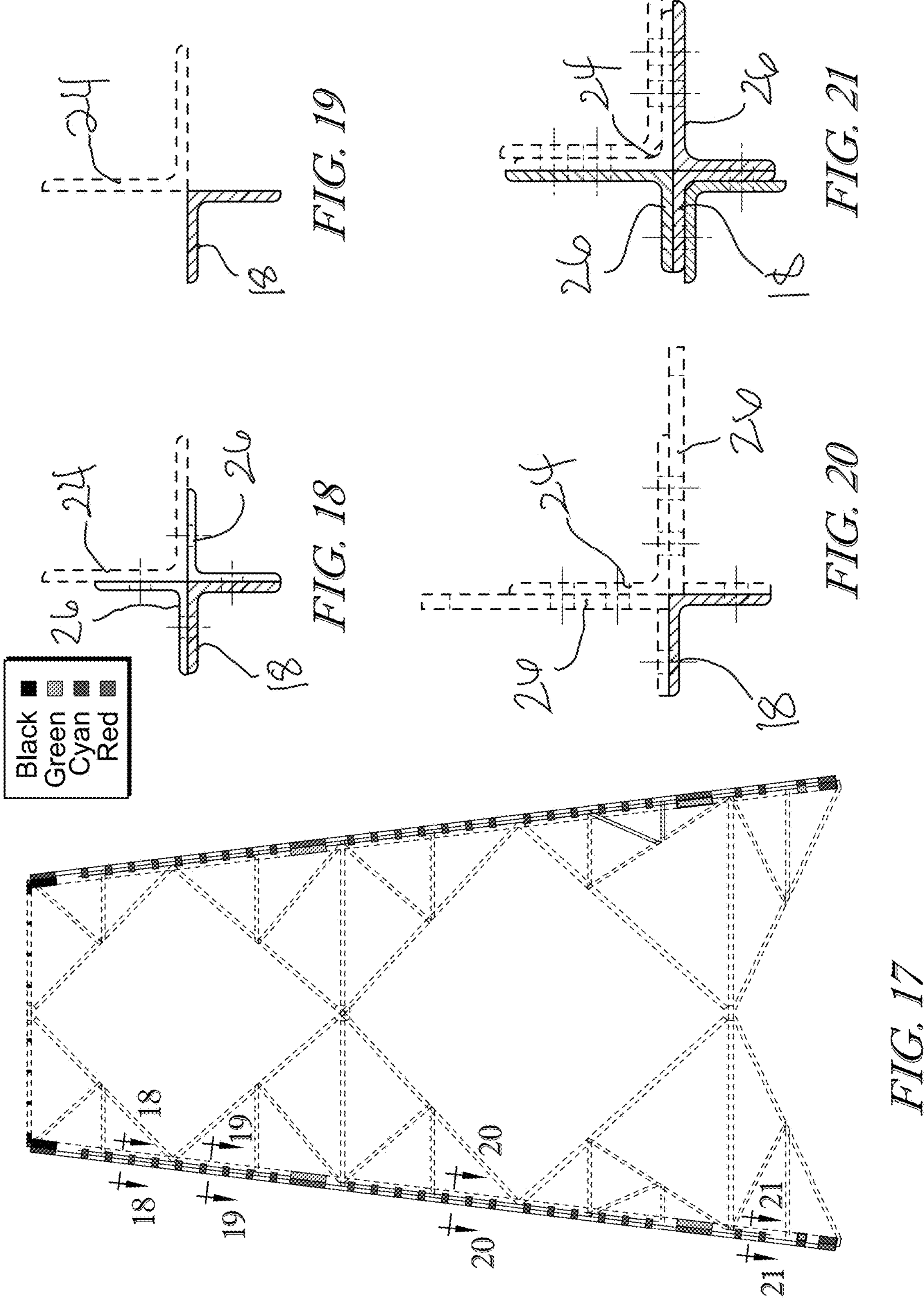
FIG. 17 is a side elevation view of a tower section including the exoskeleton superstructure detailing shown secured to an existing tower leg.
FIG. 18 is a sectional view taken along lines 18-18 of FIG. 17 showing the exoskeleton secured to the existing tower frame and using splice plates.
FIG. 19 is a sectional view taken along lines 19-19 of FIG. 17 showing the exoskeleton secured to the exiting tower by fasteners or welding.
FIG. 20 is a sectional view taken along lines 20-20 of FIG. 17 showing the exoskeleton secured to the tower structure using splice plates.
FIG. 21 is a sectional view taken along lines 21-21 of FIG. 17 showing the exoskeleton secure to the tower frame using a series of splice plates of another configuration.

The exoskeleton 16 shown in FIG. 17 provides a sample detailing of an Exogrid panel upgrade to a lattice tower pedestal, the four cross-sections of FIGS. 18-21 illustrate various Exogrid structureal configurations required to stitch and splice the section to the existing tower members. FIG. 18, represents a sample exogrid angle section (hatched) adjacent to the existing angle section. FIG. 19 represents the stitch angles that are used to mount/fasten the Exogrid angle section (hatched) to the existing angle section. FIG. 20 represents the Exogrid angle section (hatched) mounted to an existing gusset plate section/splice, and FIG. 21 illustrates the Exogrid angle section and additional splice angles that may be required to tie the sections together at a existing lap splice.

The method of designing and installing the system upgrades to an existing tower 12 requires several phases. These phases include the feasibility study phase, the condition assessment phase, and the detailed design and analysis phase. The project feasibility study phase is the first phase in the method of the present disclosure. The project feasibility study phase requires the evaluation and analysis of existing tower configurations to determine the applicability for adding additional overhead top section circuits 14 to the existing towers 12. This phase includes evaluation of transmission line upgrade needs and determining voltage requirements for additional overhead circuits. Voltage requirement will dictate the geometry of the additional overhead circuit, conductor type, bundle configuration, phase configuration (horizontal/delta), horizontal and vertical phase spacing. The project feasibility study phase includes preliminary as built and upgrade analysis models of the structures to determine high-level feasibility of the upgrade. FIGS. 1-3 illustrate concept upgrade configurations and FIG. 7 illustrates preliminary modelling sample upper section 14—new circuits and lower section—tower and foundation upgrades using structural exoskeleton supports attached and unattached.

Next, the method involves the conditional assessment phase of the actual tower structures. This phase involves field evaluation focusing on the condition of the existing structures. Generally conducted as a ground based visual inspection of the super-structure to evaluate requirements for structural maintenance and repairs that may need to be incorporated into the detailed design phase. Depending on the availability of as-built information and drawings, a climbing inspection may be required to gather detailed as-built information.

Next, the method involves the foundation condition assessment. The foundation condition assessment is a field evaluation focusing on the groundline and transitional zone (shallow excavations) of the existing foundations, including maintenance and repairs that may need to be incorporated into the detailed design phase. As with the super-structure of the tower, depending on availability of as-built information/drawings select foundations may need to be exposed (daylighting) to gather detailed as-built information. Geotechnical exploration and borehole logs may be required to gather needed information to make a proper assessment on foundation condition and capacity.

Next, the method involves the detailed design and analysis phase. The detailed design and analysis phase builds on the feasibility study and condition assessment phases. This phase involves the detailed design of the new overhead tower top circuit 14 configuration and geometry for each applicable tower type, integration of the new tower top circuit 14 into the existing structure, and detailed design of upgrades of the existing structures and foundations, including the inclusion of an exoskeleton 16 and upgraded foundation. The new tower top circuit 14 configuration involves integration of new tower top circuit 14 into existing tower structure 12 and mounting receiving brackets 15 for the new tower top circuit section 14 to existing tower 12 to secure together. The phase also includes developing the exoskeleton 16 for the existing tower 12, including the development of the tubular steel frame system and angle lattice steel frame system (bridge bypass) 17. Also the phase includes the addition of other structural sections as appropriate, such as additional T-Section, Channel, and W-Section, Plates.

Figure 12:
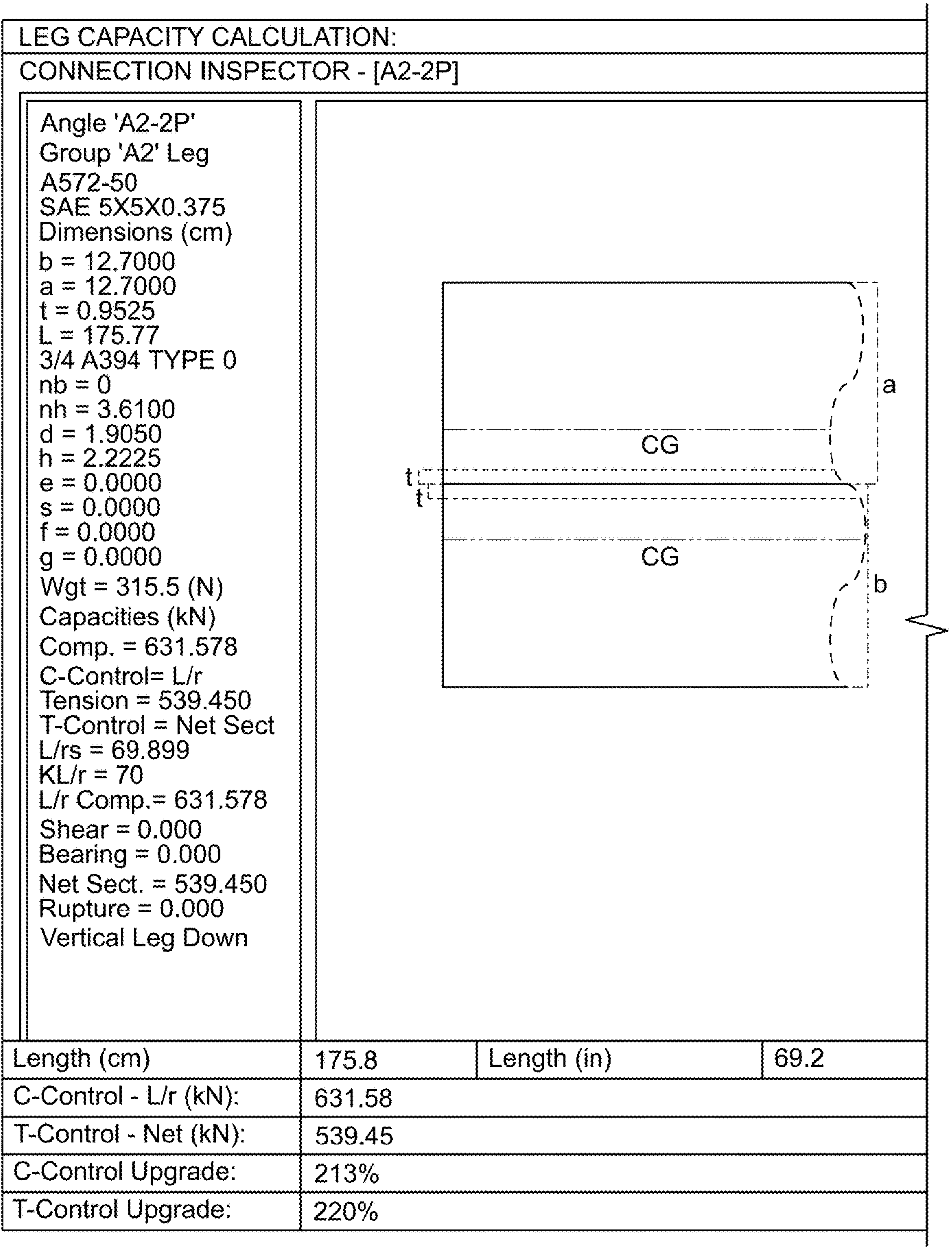
FIG. 12 is a chart showing tower leg capacity upgrade calculations.
Figure 12:
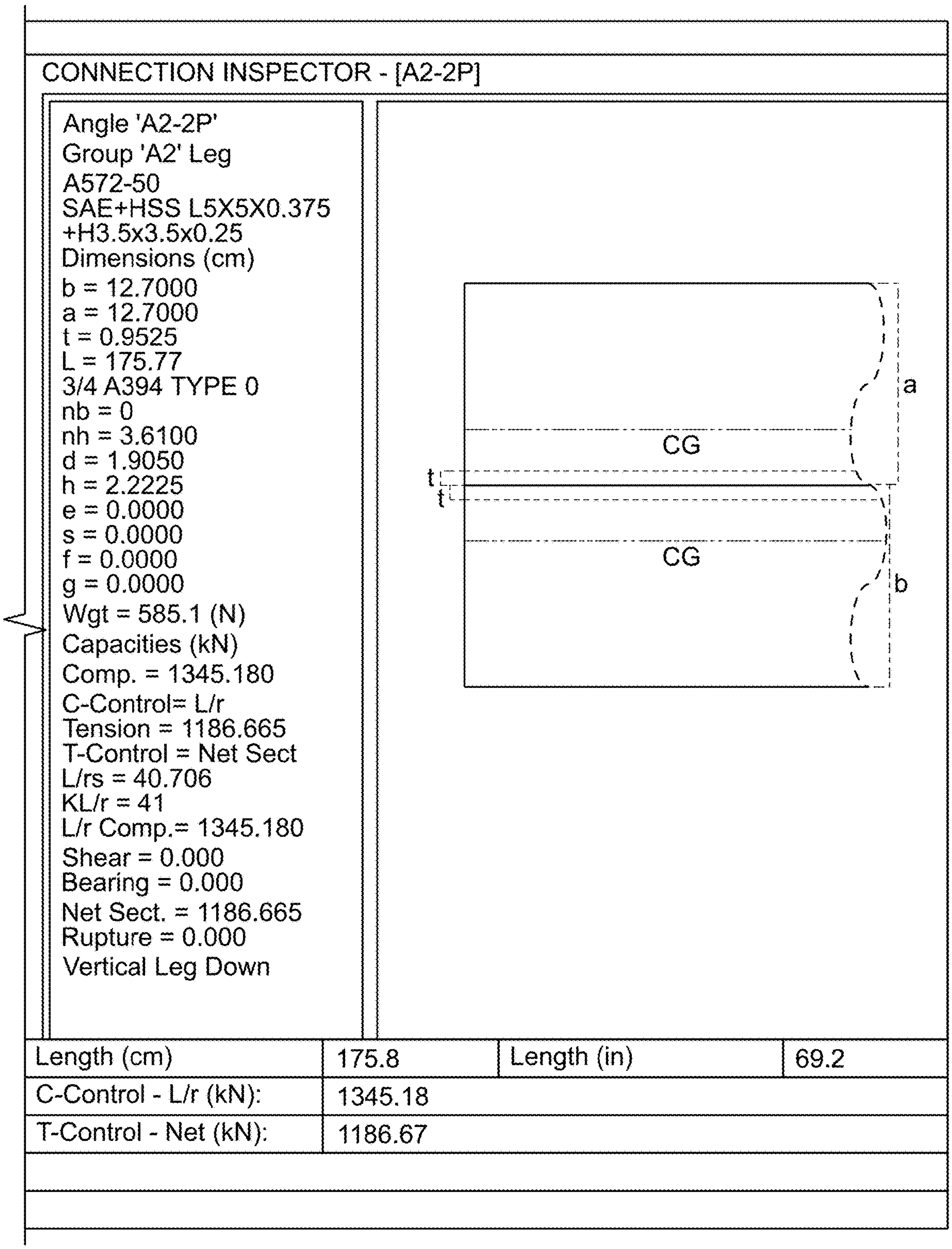
Figure 16:
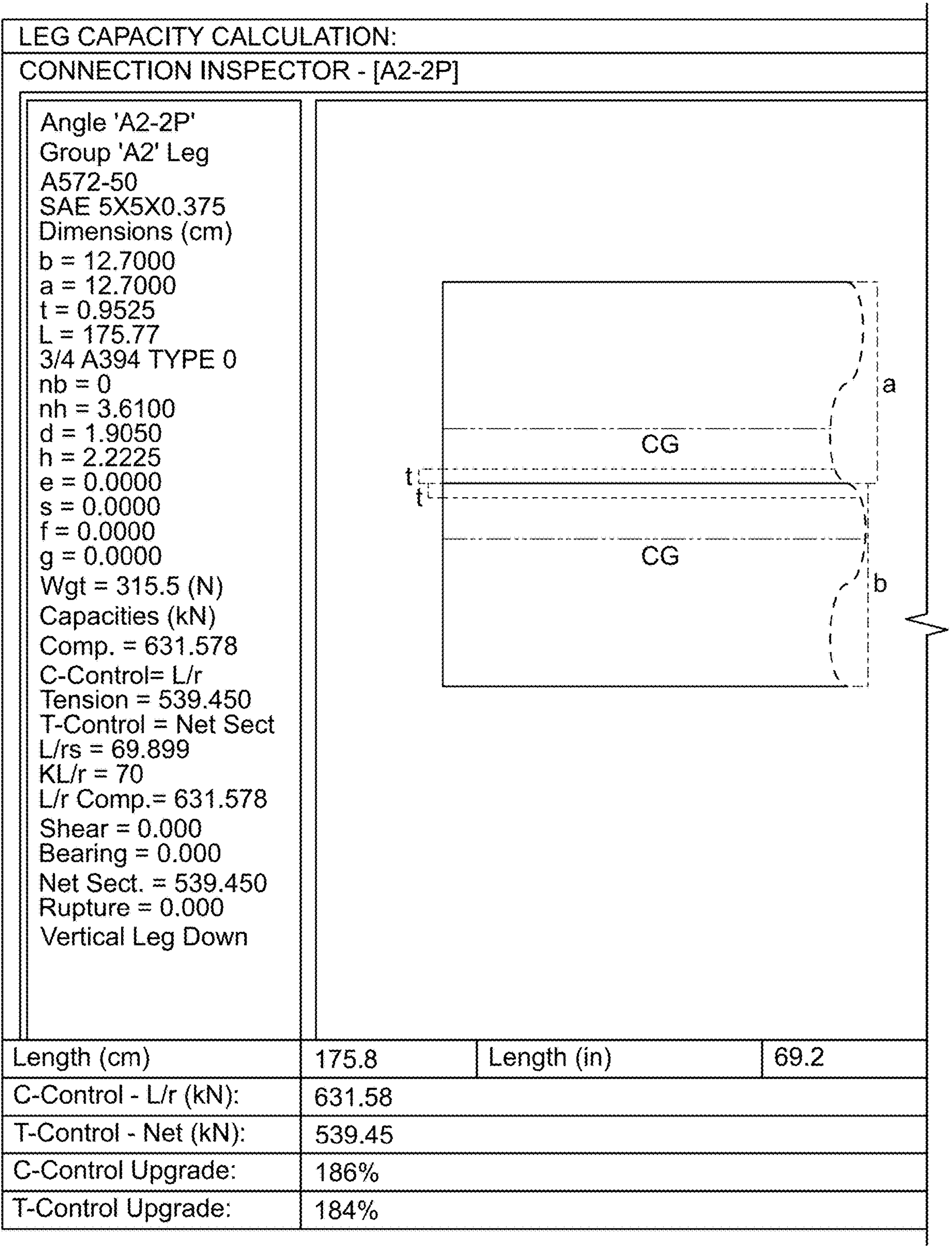
FIG. 16 is a chart showing tower leg capacity upgrade calculations.
Figure 16:
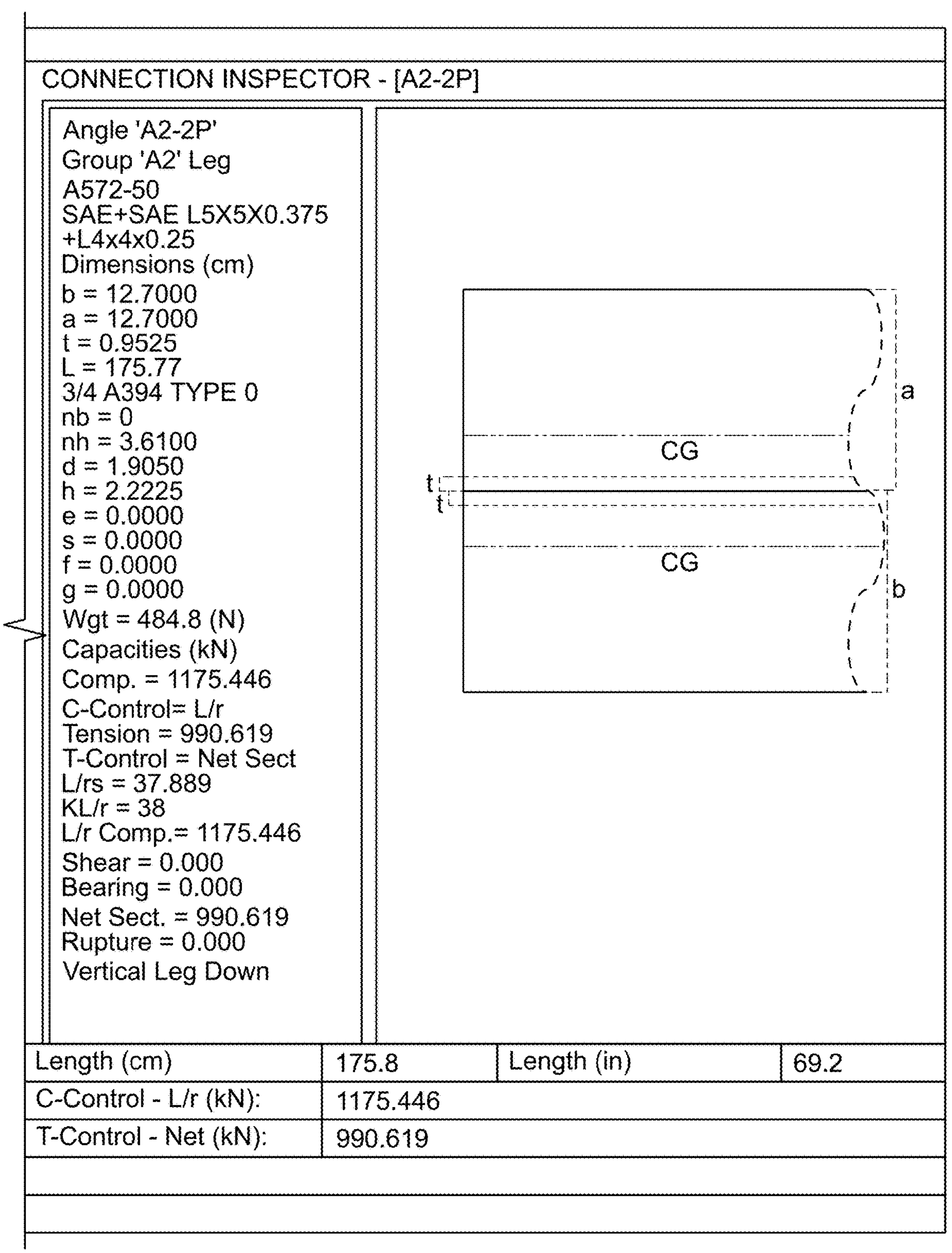

The data illustrated in FIGS. 12 and 16 are similar datasets for two of the Exogrid cross-section upgrades that might be utilized for the square tube section in FIG. 9 or the angle section of FIG. 13, with the upgraded geometric properties to an existing leg section (L5×5×3/8). The parameters for determining suitable Exogrid cross-sections are primarily the geometric parameters, cross-section area and weak axis radius of gyration (R (z)), for the two Exogrid cross-sections provided as an example, we see the square/tube section provides greater cross-sectional area upgrade (180% vs. 154%) but the angle section provides better R (2) upgrade (184% vs. 171%). This data is used in conjunction with the example dataset show in FIGS. 12 and 16.

The data in FIGS. 12 and 16 are continuation of the geometric properties for the two sample Exogrid cross-sections of the square tube section and angle section and the tables show the upgraded structural performance of the sections. The data illustrates the increased structural capacity of the sample square tube section and angle section options increase by 185% to 220% when compared to the original structure, and the Exogrid structure is sized and detailed for the demands of a specific tower application.

The detailed design and analysis phase next includes necessary upgrades of the existing structures 12 and foundations 20. Structure upgrades may include tower leg reinforcements, cruciform leg sections, tower panel upgrades, member and bolted connection replacement to upgrade capacity. Foundation upgrades may also include bearing, uplift, shear upgrades, foundation bypass, or shared loading configurations, earth strengthen, and site grading.

Detailed design involves specialty transmission line and structure analysis software, combined FEA (Stress/Strain Analysis, and Nodal Analysis), 3D CAD modelling of the components, integration and structure and foundation upgrades. Complete construction and methodology drawings are produced during the detailed design phase.

The method next includes the construction and integration phase. This phase includes initial tower 12 and foundation reinforcement 20. Tower and foundation reinforcement can often be completed without de-energizing existing circuits providing cost savings on lost revenue due to long-term outages. Existing line remains intact and in-service to maintain system redundancy and reliability during this phase of construction. The construction and integration phase includes the installation of the receiving bracket 15 for the new tower top circuit 14. Receiving bracket 15 design features include plate and hardware assemblies to adapt the existing tower members (legs and bridge), reinforcement members, and new bridge bypass space frame 17.

The pre-assembled tower top circuit 14 (angle lattice, pipe frame, tubular) is installed by lifting it onto the new bridge bypass frame 17. This installation can be accomplished by use of either a crane or helicopter. Next, installation of hardware and conductor of the additional circuits is installed including transmission line hardware (insulators, yokes, shoes, and other components.). Next, the new conductor circuit is strung and clipped into design sag. Relocation of existing or installation of new overhead ground wire (OHGW) or optical ground wire (OPGW) (if required) is next strung and clipped in to design sag. Next, there is commissioning of the new transmission circuits and energization of the new transmission circuits.

The present system and method allows for increased high-voltage transmission capacity of existing transmission lines. It allows for re-using existing rights-of-way, and reusing existing tower structures, foundations and other infrastructure. The system and method also reduce the amount of material required for structures, foundation, and infrastructure compared to building new similar capacity transmission systems. The system also reduces permitting requirements and environmental impacts associated with new construction development and reduces outage time compared to wholesale structure replacement and capacity increases. The present system and method expedites integration of gen-tie and renewable energy development and is a sustainable upgrade solution with three times or greater power upgrade on existing rights of way.

The described method can also be used in the upgrade and reclassification of tower structures. Often, in the power grid industry, there are justifications and requirements for significant performance improvements to existing structures and lines as it pertains to climate change weather events, code changes for public safety and operational performance improvements such as wildfire mitigation, extreme wind/ice and seismic loading adjustments etc. By implementing the same process and analysis of auditing, analyzing, designing and implementing an exoskeleton superstructure system all of the required improvements to meet the new reliability criteria and requirements can be achieved without the need for tearing down the existing structure and or lines of existing towers and most of the upgrades can be completed while the existing line remains in service. Further to the requirement outlined above for upgrades there is also a need in the power line industry to sometimes significantly alter or re-classify a current structure from a general light duty in-line tangent structure to a more robust angle or full tension dead-end structure. Typically, this alteration or reclassification would require a complete tear down of existing towers and footings to accommodate a full rebuild in the same or nearby location for the new tower type required. Utilizing the process and method steps described herein, an existing tower can be retrofitted from its existing design to a new configuration. The present invention can also be used in connection with dead end towers to strengthen an existing tower or add line capacity. A dead end tower is one where the wire starts and stops at the tower with a jumper in between to maintain the flow of electricity. Dead end towers can be for heavy angles or full 90 degree corners where the line changes direction significantly. The present invention can also be used in connection with termination towers. A termination tower is one where the overhead power lines terminate, and are connected to substation equipment, or transition to underground cable.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electrical utility upgrade system for an existing transmission tower having a foundation, a tower structure and an electrical circuit, the system comprising:

an exoskeleton structure coupled to the bridge bypass frame and secured to the foundation;

a bridge bypass frame positioned above the existing electrical circuit and coupled to the exoskeleton structure;

a tower top circuit positioned above the existing electrical circuit and coupled to the bridge bypass frame;

transmission line hardware coupled to the tower top circuit; and wherein forces exerted on the tower top circuit are transferred through the bridge bypass frame to the exoskeleton structure and to the foundation to reduce forces acting on the tower structure.

2. The electrical utility system of claim 1, wherein the exoskeleton includes exoskeleton framing members that are secured to existing tower framing members of the tower structure.

3. The electrical utility system of claim 2, wherein the exoskeleton framing members are secured to the tower framing members by fasteners or welding.

4. The electrical utility system of claim 2, wherein the exoskeleton framing members are secured to the foundation of the existing transmission tower.

5. The electrical utility system of claim 2, further including an enhanced foundation comprising foundation members, concrete encasements, helical piles, or poured in place piles.

6. The electrical utility system of claim 2, wherein the exoskeleton framing members comprise angle members, tubular members, or a combination of angle members and tubular members that are secured to the tower structure.

7. The electrical utility system of claim 6, further including splice and stitch members configured to secure the exoskeleton framing members to the tower framing members.

8. The electrical utility system of claim 1, wherein the exoskeleton framing members extend from the foundation to the bridge bypass frame.

9. The electrical utility system of claim 1, further including rigging and mounting supports that are configured to be secured to the tower structure to permit connection of the exoskeleton structure to be attached to the tower structure.

10. The electrical utility system of claim 1, further including one or more receiving brackets to permit the bridge bypass frame to be secured to the tower structure.

11. The electrical utility system of claim 1, wherein the tower top circuit is configured as a multiple circuit configuration.

12. The electrical utility system of claim 11, wherein the tower top circuit is configured into horizontal, vertical or delta phase configurations or combinations thereof.

13. A method of adding additional circuit capacity to an existing utility tower having existing electrical circuits and a foundation, the method comprising the steps:

adding an exoskeleton structure to the utility tower and to the foundation;

adding a bridge bypass frame to the existing tower structure above the existing electrical circuits;

adding a tower top circuit to the bridge bypass frame above the existing electrical circuits;

adding transmission line hardware to the top tower circuit; and wherein portions of the exoskeleton structure can be added to the existing utility tower without deenergizing the existing electrical circuits.

14. The method of claim 13 further comprising using the utility tower to attach rigging and mounting to the utility tower to permit connection of the exoskeleton structure to the tower structure.

15. A method of additional circuit capacity to a utility grid having a series of utility towers having a tower configuration with electrical circuits and foundations, the method comprising the following steps: evaluating existing tower configurations to determine the applicability of adding additional top section circuits to the existing towers; evaluating transmission line upgrade requirements and determining voltage requirements for additional overhead circuits; conducting field evaluation to determine the condition of the existing towers and foundations; configuring new overhead tower top circuits, exoskeletons, bridge bypass frames, and foundation supports based on information obtained from evaluating tower configurations, transmission line upgrade requirements, voltage requirements and the condition of existing towers and foundations; and installing new overhead tower top circuits, exoskeletons, bridge bypass frames, and foundation supports to the existing towers.

16. A method of claim 15 further including the step of installing new transmission lines and transmission line hardware to the new overhead tower top circuits.

17. A method of upgrading an existing electrical transmission structure, having electrical circuits and a foundation to support the electrical transmission structure, to improve performance and reliability of the existing electrical transmission structure comprising the steps of:

adding foundation members;

securing an exoskeleton frame to the electrical transmission structure and connecting the exoskeleton frame to the foundation members; and wherein portions of the exoskeleton frame and foundation members can be added to the electrical transmission structure without de-energizing the existing electrical circuits.

18. A method of converting an in-line electrical transmission structure, having electrical circuits and a foundation to support the electrical transmission structure into an angle or dead end electrical transmission structure comprising the steps of:

adding foundation members;

securing an exoskeleton frame to the in-line electrical transmission structure and connecting the exoskeleton frame to the foundation members; and wherein portions of the exoskeleton frame and foundation members can be added to the electrical transmission structure without de-energizing the existing electrical circuits.

* * * * *